US007754330B2

(12) United States Patent
Hamada et al.

(10) Patent No.: US 7,754,330 B2
(45) Date of Patent: Jul. 13, 2010

(54) ORGANIC SILICON OXIDE CORE-SHELL PARTICLES AND PREPARATION METHOD THEREOF, POROUS FILM-FORMING COMPOSITION, POROUS FILM AND FORMATION METHOD THEREOF, AND SEMICONDUCTOR DEVICE

(75) Inventors: Yoshitaka Hamada, Niigata-ken (JP); Fujio Yagihashi, Niigata-ken (JP); Takeshi Asano, Niigata-ken (JP); Hideo Nakagawa, Shiga (JP); Masaru Sasago, Osaka (JP)

(73) Assignees: Shin-Etsu Chemical Co., Ltd., Tokyo (JP); Panasonic Corporation, Osaka (JP)

( * ) Notice: Subject to any disclaimer, the term of this patent is extended or adjusted under 35 U.S.C. 154(b) by 0 days.

(21) Appl. No.: 12/472,681

(22) Filed: May 27, 2009

(65) Prior Publication Data

US 2009/0294726 A1 Dec. 3, 2009

(30) Foreign Application Priority Data

May 30, 2008 (JP) ............................ 2008-142344

(51) Int. Cl.
*B32B 5/16* (2006.01)

(52) U.S. Cl. ....................... 428/403; 428/323; 428/331; 428/404; 428/405; 428/446; 428/447; 428/448

(58) Field of Classification Search ................. 428/232, 428/331, 403, 404, 405, 407, 446, 447, 448
See application file for complete search history.

(56) References Cited

U.S. PATENT DOCUMENTS

| | | | | |
|---|---|---|---|---|
| 6,465,387 | B1 * | 10/2002 | Pinnavaia et al. | 502/158 |
| 6,930,393 | B2 * | 8/2005 | Hamada et al. | 257/758 |
| 6,974,970 | B2 * | 12/2005 | Rantala et al. | 257/40 |
| 7,132,473 | B2 * | 11/2006 | Ogihara et al. | 524/588 |
| 7,244,657 | B2 * | 7/2007 | Ogihara et al. | 438/409 |
| 7,402,621 | B2 * | 7/2008 | Ogihara et al. | 524/321 |
| 7,405,459 | B2 * | 7/2008 | Ogihara et al. | 257/499 |
| 2004/0091419 | A1 | 5/2004 | Ogihara et al. | |
| 2005/0165197 | A1 | 7/2005 | Ogihara et al. | |
| 2007/0108593 | A1 | 5/2007 | Ogihara et al. | |
| 2008/0090070 | A1 * | 4/2008 | Muraguchi et al. | 428/332 |

FOREIGN PATENT DOCUMENTS

| | | |
|---|---|---|
| JP | 10-081839 | 3/1998 |
| JP | 2004-161535 | 6/2004 |
| JP | 2005-216895 | 8/2005 |
| JP | 2007-262257 | 10/2007 |

OTHER PUBLICATIONS

The machine translation of JP 10-081839.*
"Low-k Materials and Process Integration after the 65nm and 45nm Generations", *from proceedings of a lecture held by Electronic Journal* (2006).

* cited by examiner

*Primary Examiner*—H. (Holly) T Le
(74) *Attorney, Agent, or Firm*—Myers Bigel Sibley & Sajovec, PA

(57) ABSTRACT

Provided are organic silicon oxide fine particles which can be formed into a porous film having a dielectric constant and mechanical strength expected as a high-performance porous insulating film and having excellent chemical stability, and a preparation method thereof. Described specifically, provided are an organic silicon oxide fine particle comprising a core containing at least an inorganic silicon oxide or an organic silicon oxide and a shell containing at least an organic silicon oxide and being formed around the core by using shell-forming hydrolyzable silane in the presence of a basic catalyst; wherein of silicon atoms constituting the core or the shell, a ratio (T/Q) of a number (T) of silicon atoms having at least one bond directly attached to a carbon atom to a number (Q) of silicon atoms having all of four bonds attached to an oxygen atom is greater in the shell than in the core; and wherein the shell-forming hydrolyzable silane comprise at least a hydrolyzable silane compound having two or more hydrolyzable-group-having silicon atoms bound to each other via a carbon chain or via a carbon chain containing one silicon atom between some carbon atoms.

4 Claims, No Drawings

ORGANIC SILICON OXIDE CORE-SHELL PARTICLES AND PREPARATION METHOD THEREOF, POROUS FILM-FORMING COMPOSITION, POROUS FILM AND FORMATION METHOD THEREOF, AND SEMICONDUCTOR DEVICE

CROSS-RELATED APPLICATIONS

This application claims priority from Japanese Patent Application No. 2008-142344; filed May 30, 2008, the disclosure of which is incorporated herein by reference in its entirety.

BACKGROUND OF THE INVENTION

1. Field of the Invention

The present invention relates to organic silicon oxide fine particles which can be formed into a porous film excellent in dielectric properties, mechanical strength and chemical stability by application, a preparation method thereof, a film-forming composition, a formation method of a porous film, a porous film formed thereby, and a semiconductor device having the porous film.

2. Description of the Related Art

In the fabrication of semiconductor integrated circuits, as their integration degree becomes higher, an increase in interconnect delay time due to an increase in interconnect capacitance, which is a parasitic capacitance between metal interconnects, prevents their performance enhancement. The interconnect delay time is called an RC delay which is in proportion to the product of the electric resistance of metal interconnects and the static capacitance between interconnects. Reduction in the resistance of metal interconnects or reduction in the capacitance between interconnects is necessary for reducing this interconnect delay time. The reduction in the resistance of an interconnect metal or interconnect capacitance can prevent even a highly integrated semiconductor device from causing an interconnect delay, which enables size reduction and high speed operation of it and moreover, minimization of power consumption.

In order to reduce the resistance of metal interconnects, semiconductor device structures using copper as metal interconnects have recently replaced those using conventional interconnects made of aluminum. Use of copper interconnects alone, however, has limits in accomplishing performance enhancement so that reduction in the interconnect capacitance is an urgent necessity for further performance enhancement of semiconductor devices.

One method for reducing interconnect capacitance is to reduce the dielectric constant of an interlayer insulating film disposed between metal interconnects. As such a low dielectric constant insulating film, use of a porous film instead of a conventionally used silicon oxide film is now studied. In particular, since a porous film is only one practical film as a material being suited as an interlayer insulating film and having a dielectric constant not greater than 2.5, various methods for forming a porous film have been proposed. When an interlayer insulating film is made porous, however, reduction in mechanical strength and adsorption of water are likely to deteriorate the film so that reduction in dielectric constant (k) by introduction of pores into the film and maintenance of sufficient mechanical strength and hydrophobicity are serious problems that need to be overcome.

A silica film having enhanced mechanical strength can be obtained, for example, by increasing the proportion of tetrafunctional silicon units as a silicon unit constituting the film, thereby constructing a densely crosslinked siloxane structure to form hard particles. In practice, a film obtained by plasma polymerization of tetrafunctional TEOS shows strength as high as 80 GPa in bulk form (form having no porosity). When a film is prepared from a hydrolysis condensate of a trifunctional alkoxysilane having a methyl group, on the other hand, it shows strength of 20 GPa or less even in bulk form ("*Low-k Materials and Process Integration after the* 65 *nm and* 45 *nm Generations*", by Eiki Shibata, proceedings of a lecture held by Electronic Journal on Apr. 18, 2006, at Ochanomizu/Tokyo). Even if pores are introduced into the above film to decrease their dielectric constant, the strength in bulk form still maintains. Accordingly, it is known that as the proportion of tetrafunctional units becomes larger, high strength can be achieved more easily.

With regard to chemical properties, the binding energy itself of a Si—O bond is greater than that of a Si—C bond so that the former gives a structure resistant to heat decomposition. Difference in reactivity with a chemical substance such as washing fluid is, on the other hand, attributable to a large difference in polarity between the Si—C bond and the Si—O bond. The Si—O bond having a greater polarity is susceptible to the attack (nucleophilic attack) of the chemical substance. Similarly, comparison in polarity between tetrafunctional silicon and trifunctional silicon has revealed that an electron density at the center of tetrafunctional silicon lowers (greater $\delta+$) with the number of Si—O bonds having a large polarity so that it is susceptible to nucleophilic attack. When the number of Si—O bonds decreases as silicon becomes trifunctional or bifunctional, the electron density at the center of the silicon shows a small decrease (smaller $\delta+$). As a result, it is not susceptible to the nucleophilic attack.

When a porous silica film is used as an interlayer insulating film of a semiconductor device, process damage in an etching or washing step poses a problem. In particular, hydrophilization of the surface of the porous silica film after treatment with a washing fluid and moisture absorption resulting therefrom lead to deterioration in the reliability of the semiconductor device. There is therefore a demand for overcoming such a problem.

It has been recognized that the susceptibility of a CVD-LK film to such a process damage becomes smaller with an increase in its carbon content. Also in an LK film of an application type, an increase in carbon content by introducing a carbosilane skeleton is under study (JP 2007-262257A).

SUMMARY OF THE INVENTION

An object of the invention is to provide organic silicon oxide fine particles which can be formed into a porous film satisfying an expected dielectric constant and mechanical strength and having excellent chemical stability by using a silica sol as an industrially desirable material in order to obtain a high-performance porous insulating film by application, and a preparation method of the organic silicon oxide fine particles, a film-forming composition containing them, a preparation method of a porous film, and a porous film formed thereby.

Another object of the invention is to provide a high performance and high reliability semiconductor device having the porous film obtained using the advantageous material.

As described above, when a film is viewed as a whole, there is a trade-off relationship between maintenance of mechanical strength and improvement in chemical stability by incorporating a substituent, such as alkyl or alkylene, containing carbon having a direct bond to silicon in a hydrolyzable silane compound used for obtaining silica to be used as a film material, thereby increasing a ratio (T/Q ratio) of the number (T) of silicon atoms having a bond directly attached to a carbon atom to the number (Q) of silicon atoms having four bonds all of which are attached to an oxygen atom. Simple blending of a material having high mechanical strength and a material having high chemical stability results in the formation of the corresponding material which is not an expected material.

The present inventors therefore made the following working hypothesis for improving the performance of a porous-film-forming coating solution making use of silica.

According to their hypothesis, it is preferred to place parts having respective functions only at required positions thereof in order to obtain physical properties different among the positions; and moreover, it is preferred to use a material in which only necessary amounts of potentially necessary parts are arranged at proper positions in order to achieve such controlled arrangement by using a uniform coating solution. It is possible to achieve such a particular arrangement by employing a structure in which a core portion of silica particles and an peripheral film covering the periphery of the core portion are derived from different materials, respectively. A film in which a material constituting a core portion and a material constituting an peripheral film have been arranged regularly can be obtained only by applying a coating solution of such organic silicon oxide fine particles to a substrate. Composite type organic silicon oxide fine particles using different materials for core and shell, respectively, are thus presumed to be useful.

Further, the present inventors thought that a film formed using composite type organic silicon oxide fine particles obtained using a material having high mechanical strength for the core and another material capable of giving chemical stability for the shell has high chemical stability because the above T/Q ratio in a region contiguous to the outside is high and at the same time, cores are arranged at intervals formed by the shell to achieve high mechanical strength while preventing uneven presence of the material having low mechanical strength. Moreover, the present inventors thought that when the shell is soft, a contact area of the organic silicon oxide fine particles each other becomes wide, interparticle bonds are formed by baking while maintaining the wide contact area, and formation of a matrix having high mechanical strength can be expected.

In the surface modification for changing the quality of silica particles or zeolite particles, a method of modifying the side chain thereof having a mercapto group in order to give a bond formation capacity to a polymerizable functional group is known (JP 10-81839A). This method gives reactivity while offering freedom to the surface-modified functional group. Since an increase in condensation degree is not preferable for silane having a substituent, surface modification in JP 10-81839A is performed in the presence of an acid catalyst. From the standpoint of preventing silicon from undergoing nucleophilic attack in order to overcome the problem of the invention, the peripheral film is required to be crosslinked densely and thereby have a function of preventing invasion of a nucleophilic species into the inside of the particles. The particles obtained using an acid catalyst are therefore not preferred.

The present inventors disclose a method of modifying organic silicon oxide fine particles with a crosslinkable side chain in the presence of a basic catalyst, thereby improving an interparticle bonding power (JP 2005-216895A). This method uses a basic catalyst for freezing the activity of the crosslinking group, but it does not include a concept of imparting chemical stability to the particles by surface modification.

The present inventors have carried out an intensive investigation based on the above hypothesis. As a result, they have succeeded in forming a porous film having both mechanical strength and chemical stability by using a porous film-forming composition containing composite type silica fine particles. The composite type silica fine particles are obtained by forming a core of organic silicon oxide fine particles from a material mainly containing a tetravalent hydrolyzable silane in the presence of a basic catalyst and then by forming a shell, so as to cover the periphery of the core, by using an organic silicon oxide which has a unit having silicon atoms bonded via a hydrocarbon crosslink and mainly comprises silicon atoms each having a substituent having a carbon atom attached directly to a silicon atom. Moreover, they have found a preparation method of a coating composition capable of providing a film having improved physical properties suited for use even in a semiconductor fabrication process, leading to the completion of the invention. In this technology, not only inorganic or organic silica fine particles but also zeolite fine particles can be used as the core material. Use of them enables to enhance the strength of the core further.

In one aspect of the invention, there is thus provided an organic silicon oxide fine particle comprising:

a core containing at least an inorganic silicon oxide or an organic silicon oxide and a shell containing at least an organic silicon oxide and being formed around the core by using shell-forming hydrolyzable silane in the presence of a basic catalyst;

wherein of silicon atoms constituting the core and shell, a ratio (T/Q) of a number (T) of the silicon atoms having at least one bond directly attached to a carbon atom to a number (Q) of silicon atoms having all of the four bonds attached to an oxygen atom is greater in the shell than in the core; and wherein the shell-forming hydrolyzable silane comprise at least a hydrolyzable silane compound having two or more hydrolyzable-group-having silicon atoms bound to each other via a carbon chain or via a carbon chain containing one silicon atom between some carbon atoms.

In the composite type organic silicon oxide fine particle of the invention, the core has a smaller T/Q ratio than the shell so that it has a high Si—O—Si bond density and therefore has high mechanical stability. The shell, on the other hand, has a greater T/Q ratio than the core and has a skeleton providing a dense crosslink density so that the composite type organic silicon oxide fine particle can have a hydrophobic skin with a high condensation degree in spite of an increase in the T/Q ratio and therefore have chemical stability against a washing fluid. The shell having a greater T/Q ratio than the core has high spatial freedom and deforms easily so that it serves to increase the spatial interaction area between particles in a film formed using them.

According to another mode of the organic silicon oxide fine particle of the invention, said shell forming hydrolyzable silane comprises one or more compounds represented by the following formula (1):

$$\{R^1{}_nX^1{}_{3-n}Si—[(Y^2)—(SiR^2{}_mX^2{}_{2-m})]_p\}_q—(Y^3)—SiR^3{}_tX^3{}_{3-t} \quad (1)$$

wherein $X^1$ to $X^3$ each independently represents a hydrolyzable group selected from the group consisting of a hydrogen atom, halogen atoms and $C_{1-4}$ alkoxy groups; $R^1$ to $R^3$ each independently represents a $C_{1-20}$ alkyl group or a $C_{6-10}$ aryl group; $Y^2$ and $Y^3$ each independently represents a substituted or unsubstituted $C_{1-6}$ hydrocarbon group having q+1 valencies, a $C_{5-20}$ cycloalkane group which has q+1 valencies and may contain a fused ring structure, or a $C_{6-20}$ aromatic group having q+1 valencies; m each independently represents an integer from 0 to 2; n each independently represents an integer from 0 to 2; p each independently represents an integer from 0 to 4; q each independently represents an integer of 1 or greater, and t each independently represents an integer from 0 to 2.

According to a further mode of the organic silicon oxide fine particle of the invention, said one or more compounds represented by the formula (1) is selected from the group consisting of compounds represented by the following formula (2):

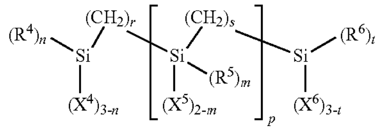

and the following formula (3):

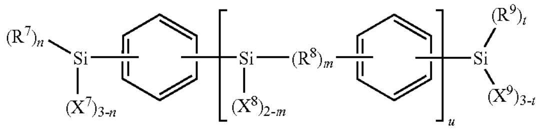

wherein $X^4$ to $X^9$ each independently represents a hydrolyzable group selected from the group consisting of a hydrogen atom, halogen atoms and $C_{1-4}$ alkoxy groups; $R^4$ to $R^9$ each independently represents a $C_{1-20}$ alkyl group or a $C_{6-10}$ aryl group; m each independently represents an integer from 0 to 2; n each independently represents an integer from 0 to 2; p each independently represents an integer from 0 to 4; r each independently represents an integer from 0 to 4; s each independently represents an integer from 0 to 4; t each independently represents an integer from 0 to 2; and u each independently represents an integer from 0 to 4.

According to a still further mode of the organic silicon oxide fine particle of the invention, the number of silicon atoms contained in the core is greater than the number of silicon atoms contained in the shell. Since the number of silicon atoms contained in the core is greater than that in the shell, the fine particle can exhibit the mechanical strength properties of the core desirably.

According to a still further mode of the organic silicon oxide fine particle of the invention, the core contains a zeolite-like recurring structure. Although zeolite-like fine particles are outside the definition of zeolite because the particle size thereof is too small to discuss its long-range regularity, zeolite itself and a recurring structure which zeolite partially has are called collectively "zeolite-like recurring structure". It has higher mechanical strength than that of amorphous silicon oxides. An Organic silicon oxide fine particle containing a core having this zeolite-like recurring structure can therefore have higher mechanical strength.

According to a still further mode of the organic silicon oxide fine particle of the invention, said inorganic silicon oxide or said organic silicon oxide of said core is an inorganic or organic silica prepared by hydrolysis/condensation of a core-forming hydrolyzable silane in the presence of a basic catalyst. The hydrolysis and condensation of a hydrolyzable silane can raise a Si—O—Si bond density when it is performed in the presence of a basic catalyst and as a result, the organic silicon oxide fine particle can have high mechanical strength.

According to a still further mode of the organic silicon oxide fine particle of the invention, said shell-forming hydrolyzable silane consists essentially of one or more hydrolyzable silane compounds having a carbon atom directly attached to a silicon atom. The term "consist essentially of" means that 95 mol % or greater, in terms of silicon (the number of silicon atoms), more preferably 98 mol % or greater, still more preferably 100% of the shell-forming hydrolyzable silane is hydrolyzable silane substituted with a substituent having a carbon atom directly attached to a silicon atom. This makes it possible to prevent formation of a portion having weak chemical stability on the surface of the shell and impart high chemical stability to the whole fine particle.

According to a still further mode of the organic silicon oxide fine particle of the invention, it comprises an intermediate layer between the core and the shell. The silicon oxide fine particle may consist essentially of a core and a shell, but it may have an intermediate layer therebetween. The thickness of the shell should be increased slightly when the intermediate layer is inserted and this leads a slight reduction in the improving effect of mechanical strength derived from the core. But the intermediate layer can widen the contact area between particles at the time of film formation so that a film obtained using such silicon oxide fine particle can have chemical stability without reducing the mechanical strength of the film itself.

In another aspect of the invention, there is also provided a method for producing an organic silicon oxide fine particle, comprising steps of:

adding first hydrolyzable silane to water or a mixed solution of water and an alcohol to carry out hydrolysis and condensation of the resulting mixture in the presence of a basic catalyst to form a core, wherein the first hydrolyzable silane is a silane compound or compounds, containing at least one compound represented by the following formula (4):

$$Si(OR^{10})_4 \quad (4)$$

wherein $R^{10}$ may be the same or different and each independently represents a linear or branched $C_{1-4}$ alkyl group; and adding, to the reaction mixture for the core, second hydrolyzable silane which is a hydrolyzable silane compound or a mixture of two or more hydrolyzable silane compounds to form a shell, wherein of silicon atoms constituting the first hydrolyzable silane or the second hydrolyzable silane, a ratio (T/Q) of a number (T) of silicon atoms having at least one bond directly attached to a carbon atom to a number (Q) of silicon atoms having all of the four bonds attached to an oxygen atom is greater in the second hydrolyzable silane than in the first hydrolyzable silane; and the second hydrolyzable silane contains a hydrolyzable silane compound having two or more hydrolyzable-group-having silicon atoms bound to each other via a carbon chain or via a carbon chain containing one silicon atom between some carbon atoms. Use of the production method comprising such operations facilitates production of silicon oxide fine particle having, on the periphery of a core with high mechanical stability, a shell with high chemical stability.

According to another aspect of the method for producing an organic silicon oxide fine particle of the invention, after addition of a total amount of the first hydrolyzable silane, reaction conditions permitting progress of the hydrolysis and condensation of the added first hydrolyzable silane are maintained and the step of adding of the second hydrolyzable silane is started. Insertion of the so-called aging operation as described above enables to form a shell with a thin layer and as a result, the mechanical strength of the core can be reflected highly in the particle.

According to a further aspect of the method for producing an organic silicon oxide fine particle of the invention, prior to completion of the addition of a total amount of the first hydrolyzable silane, the step of adding of the second hydrolyzable silane is started. Use of such a process facilitates formation of an intermediate layer between the core and the shell, having an intermediate composition therebetween, and as described above, chemical stability can be imparted without significantly reducing the mechanical strength of the film itself.

According to a further aspect of the method for producing an organic silicon oxide fine particle of the invention, the second hydrolyzable silane is represented by the following formula (1):

$$\{R^1{}_nX^1{}_{3-n}Si—[(Y^2)—(SiR^2{}_mX^2{}_{2-m})]_p\}_q—(Y^3)—SiR^3{}_tX^3{}_{3-t} \quad (1)$$

wherein, $X^1$ to $X^3$ each independently represents a hydrolyzable group selected from the group consisting of a hydrogen atom, halogen atoms and $C_{1-4}$ alkoxy groups; $R^1$ to $R^3$ each independently represents a $C_{1-20}$ alkyl group or a $C_{6-10}$ aryl group; $Y^2$ and $Y^3$ each independently represents a substituted or unsubstituted $C_{1-6}$ hydrocarbon group having q+1 valencies, a $C_{5-20}$ cycloalkane group which has q+1 valencies and may contain a fused ring structure, or a $C_{6-20}$ aromatic group having q+1 valencies; m each independently represents an integer from 0 to 2, n(s) each independently represents an integer from 0 to 2; p each independently represents an integer from 0 to 4; q each independently represents an integer of 1 or greater; and t each independently represents an integer from 0 to 2.

In a further aspect of the invention, there is also provided a porous-film-forming composition containing the organic silicon oxide fine particle and an organic solvent. Use of the porous-film-forming composition facilitates production of a porous film having both high mechanical stability and high chemical stability.

In a still further aspect of the invention, there is also provided a porous film obtained using the porous-film-forming composition. The porous film of the invention has high mechanical strength and at the same time, high chemical stability so that it can be suited for uses requiring to satisfy both of them simultaneously, particularly a low dielectric constant film to be used in a semiconductor device.

In a still further aspect of the invention, there is also provided a method for forming a porous film, comprising steps of:

applying the porous-film-forming composition to form a film, and subjecting the film to heat and/or to an electron beam or light. By the method comprising the step of applying the porous-film-forming composition to form a film and the heating step, a porous film having high mechanical strength and high chemical stability can be obtained.

According to another mode of the method for forming a porous film of the invention, said step of subjecting comprises subjecting to heat and to an electron beam or light. The film exposed to an electron beam or light has higher strength because it increases the number of Si—O—Si bonds efficiently.

In a still further aspect of the invention, there is also provided a semiconductor device comprising the porous film as an insulating film. The semiconductor device using the porous film as an insulating film in the production process of it can have high reliability.

The invention makes it possible to provide an organic silicon oxide fine particle which can be formed into a porous film excellent in dielectric properties, mechanical strength, and chemical stability by application, a production method thereof, a film-forming composition, a formation method of a porous film and a porous film formed thereby, and a semiconductor device having the porous film.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms “a”, “an” and “the” are intended to include the plural forms as well, unless the context clearly indicates otherwise.

Unless otherwise defined, all technical and scientific terms used herein have the same meaning as commonly understood by one of ordinary skill in the art to which this invention belongs.

Hereinafter, preferred embodiments of the present invention will be described. However, it is to be understood that the present invention is not limited thereto.

The organic silicon oxide fine particles and production method thereof, film-forming composition, porous film and formation method thereof, and semiconductor device according to the invention will hereinafter be described specifically. The present invention is however not limited to the following embodiments.

The present invention relates to organic silicon oxide fine particles comprising a core containing at least an inorganic silicon oxide or an organic silicon oxide and a shell containing at least an organic silicon oxide formed around the core by using a hydrolyzable silane in the presence of a basic catalyst. They are composite type organic silicon oxide fine particles comprising a core which has a smaller T/Q ratio than that of the shell, a high Si—O—Si density, and therefore has excellent mechanical strength, wherein the T/Q ratio means that, of silicon atoms constituting the fine particles, a ratio of the number (T) of silicon atoms having at least one bond directly attached to a carbon atom to the number (Q) of silicon atoms having all the four bonds directly attached to an oxygen atom; and a hydrophobic skin having a higher T/Q ratio than that of the core and having a skeleton derived from multinuclear hydrolyzable silane having hydrolyzable-group-having silicon atoms bound to each other via a hydrocarbon and capable of giving a dense crosslink density and mechanical flexibility simultaneously, and therefore having a high condensation degree. The composite-type organic silicon fine particles therefore have chemical stability against a washing fluid or the like and have softness only on the surface of them. An object of the organic silicon oxide fine particles of the invention is to form a film having a micro regular arrangement by using the organic silicon oxide fine particles of the invention, which use different materials for the core and the shell respectively, and allow them to exhibit desirable physical properties, respectively, compared with use of these materials simply as a mixed or bonded material.

The organic silicon oxide fine particles found by the present inventors and having both mechanical strength and chemical stability have a layered structure in which the hard core contributing to mechanical strength is covered completely with a shell contributing to chemical stability and mechanical flexibility.

The organic silicon oxide fine particles of the invention have an average particle size of preferably 50 nm or less, more preferably 5 nm or less. The organic silicon oxide fine particles having a particle size exceeding 50 nm may generate striation upon spin coating and thus have an adverse effect. The particle size of the fine particles can be measured using, for example, a submicron particle size distribution analyzer "N4Plus" (trade name; product of Coulter), but its lower measurement limit is 2 nm. There is no effective means for measuring the particle sizes less than 2 nm. The preferable lower limit of the particle size can therefore be considered theoretically as follows. Described specifically, the average particle size of the core less than 0.5 nm is not preferred, because a proportion of a shell component which will be described later may become too high relative to the core component, leading to shortage in physical strength for which the core must be responsible. The thickness of the shell is preferably from 0.025 to 0.5 nm, more preferably from 0.05 to 0.2 nm. The shell having a thickness less than 0.025 nm may not sufficiently cover the surface of the particles and therefore may not achieve expected chemical stability. The thickness exceeding 0.5 nm, on the other hand, may presumably cause lack of physical strength because the proportion of the shell component may become too high relative to the core component.

[Core]

An inorganic silicon oxide or an organic silicon oxide can be used for the core having high mechanical strength. More specifically, materials conventionally used as a constituent material of a porous-film-forming composition for imparting mechanical strength to a film such as silicon oxide fine particles having a zeolite-like recurring structure and an inorganic or organic silica can be used.

(I) Core Containing Silicon Oxide having a Zeolite-like Recurring Structure

Silicon oxide having a zeolite-like recurring structure includes as described above zeolite itself, clusters having a size of about 1 nm and having crystal lattices arranged with insufficient regularity, and zeolite crystal precursors having a size of from about 10 to 15 nm. They will hereinafter be called zeolite collectively and simply. High-strength organic silicon oxide fine particles can be obtained using, as a core, zeolite having markedly great mechanical strength.

Zeolite crystals can be obtained, for example, by mixing tetraethoxysilane and tetrapropylammonium hydroxide, reacting the mixture at room temperature for 3 days or more to obtain a seed crystal, then reacting the resulting seed crystal at 80° C. for 10 hours. When an organic-group-containing silane component is added during high-temperature reaction, however, formation of zeolite crystals does not proceed completely. The formation process of zeolite crystals can be confirmed by XRD. Compared with zeolite crystals obtained by the ordinary reaction, those using a zeolite seed crystal have difficulty in exhibiting a clear analysis pattern because of insufficient crystal growth. Although the reaction product obtained by adding an organic silane component has disorders in the crystal structure and includes a noise in its analysis pattern, signals derived from the crystal structure can be observed.

Zeolite fine particles to be used for the core of the invention preferably have an average particle size of from 0.5 to 50 nm. Zeolite fine particles can be synthesized by the hydrothermal synthesis of a silane having, on the silicon atom thereof, four hydrolyzable groups such as tetraethoxysilane (which will hereinafter be called "Q unit precursor" or "Q unit monomer") and an ammonium salt called "structure-directing agent". Use of zeolite fine particles synthesized in a conventional manner and having a particle size exceeding 100 nm may roughen the surface of a coated film. Zeolite fine particles can be synthesized advantageously by the hydrothermal synthesis at low temperatures as disclosed by the present inventors in JP 2004-161535A.

Zeolite fine particles can be obtained by hydrolyzing preferably a silane compound represented by the following formula (4):

$$Si(OR^{10})_4 \quad (4)$$

wherein $R^{10}$ may be the same or different and each independently represents a linear or branched $C_{1-4}$ alkyl group, in the presence of a structure-directing agent and a basic catalyst, followed by heating treatment. The agent and the catalyst will be described later.

Examples of the preferred silane compound of the formula (4) to be used for the formation of zeolite fine particles include tetramethoxysilane, tetraethoxysilane, tetrapropoxysilane, tetrabutoxysilane, tetraisopropoxysilane, tetraisobutoxysilane, triethoxymethoxysilane, tripropoxymethoxysilane, tributoxymethoxysilane, trimethoxyethoxysilane, trimethoxypropoxysilane, and trimethoxybutoxysilane. These silane compounds may be used either singly or in combination.

It is known that the structure-directing agent determines the crystal type of zeolite and thus has an important role. The structure-directing agent may preferably include, for example, a quaternary organic ammonium hydroxide represented by the following formula (5):

$$(R^{11})_4N^+OH^- \quad (5)$$

wherein $R^{11}$ may be the same or different and each represents a linear or branched $C_{1-5}$ alkyl group.

Specific preferred examples of $R^{11}$ include methyl, ethyl, propyl and butyl groups. Specific examples of such a structure-directing agent include tetramethylammonium hydroxide, tetraethylammonium hydroxide, tetrapropylammonium hydroxide, tetrabutylammonium hydroxide, triethylmethylammonium hydroxide, tripropylmethylammonium hydroxide and tributylmethylammonium hydroxide.

For the preparation of a zeolite sol, the structure-directing agent may be used as a mixture with a silane compound. The structure-directing agent is added in an amount of preferably from 0.1 to 20 mols, more preferably from 0.5 to 10 mols per mol of the silane compound or compounds represented by the formula (4).

The basic catalyst used in the synthesis may serve to accelerate hydrolysis and condensation of the silane compound.

Preferred examples of the basic catalyst include compounds represented by the following formula (6):

$$(R^{12})_3N \qquad (6)$$

wherein $R^{12}$ may be the same or different and each independently represents a hydrogen atom or a linear, branched or cyclic $C_{1-20}$ alkyl or aryl group, with the proviso that the hydrogen atom contained in the alkyl or aryl group may be substituted with a hydroxy or amino group;

and compounds represented by the following formula (7):

$$(R^{13})_pX^{10} \qquad (7)$$

wherein $R^{13}$ may be the same or different and each independently represents a hydrogen atom or a linear, branched or cyclic $C_{1-20}$ alkyl or aryl group, with the proviso that the hydrogen atom contained in the alkyl or aryl group may be substituted with a hydroxy or amino group, n stands for an integer from 0 to 3, and $X^{10}$ represents a p-valent heterocyclic compound containing a nitrogen atom.

Examples of $R^{12}$ include hydrogen atom, and methyl, ethyl, propyl, isopropyl, butyl, isobutyl, pentyl, hexyl, heptyl, octyl, decyl, dodecyl, octadecyl, cyclohexyl, phenyl and tolyl groups.

Examples of the basic catalyst represented by the formula (6) include ammonia, methylamine, ethylamine, propylamine, butylamine, pentylamine, dodecylamine, octadecylamine, isopropylamine, t-butylamine, ethylenediamine, 1,2-diaminopropane, 1,3-diaminopropane, hexamethylenediamine, dimethylamine, diethylamine, dipropylamine, diisopropylamine, dibutylamine, trimethylamine, triethylamine, tripropylamine, tributylamine, N,N-dimethyloctylamine, triethanolamine, cyclohexylamine, aniline, N-methylaniline, diphenylamine and toluidines.

Examples of $R^{13}$ include hydrogen atom and methyl, ethyl, propyl, isopropyl, butyl, isobutyl, pentyl, hexyl, heptyl, octyl, decyl, dodecyl, octadecyl, cyclohexyl, phenyl, tolyl, amino, methylamino, ethylamino, propylamino, butylamino, pentylamino, dodecylamino, octadecylamino, isopropylamino, t-butylamino, dimethylamino, diethylamino, dipropylamino, diisopropylamino, dibutylamino, N,N-dimethyloctylamino, cyclohexylamino and diphenylamino groups.

Examples of $X^{10}$ include pyrrolidine, piperidine, morpholine, pyridine, pyridazine, pyrimidine, pyrazine and triazine.

Examples of the basic catalyst represented by the formula (7) include pyrrolidine, piperidine, morpholine, pyridine, picolines, phenylpyridines, N,N-dimethylaminopyridine, pyridazine, pyrimidine, pyrazine and triazine.

Of the above compounds, ammonia, methylamine, ethylamine, propylamine, isopropylamine, pyrrolidine, piperidine, morpholine and pyridine are especially preferred as the basic catalyst. The basic catalyst may be used either singly or in combination.

The basic catalyst may be mixed with the silane compound or compounds represented by the formula (4) and the structure-directing agent represented by the formula (5). The amount of the basic catalyst is preferably from 0.01 to 20 mols, more preferably from 0.05 to 10 mols per mol of the silane compound or compounds represented by the formula (4).

When a zeolite sol is prepared by hydrolysis and condensation of the silane compound(s) of the formula (4), water for hydrolysis is required as well as the silane compound(s), the structure-directing agent, and the basic catalyst. Water may be added in an amount of from 0.1 to 100 times the weight, more preferably from 0.5 to 20 times the weight, based on the weight of the silane compound.

When a zeolite sol is prepared by hydrolysis and condensation of the silane compound(s) of the formula (4), a solvent such as alcohol may be added as well as water. Examples of the solvent include methanol, ethanol, isopropyl alcohol, butanol, propylene glycol monomethyl ether, propylene glycol monopropyl ether, propylene glycol monopropyl ether acetate, ethyl lactate and cyclohexanone. The solvent may be added in an amount of preferably from 0.1 to 100 times the weight, more preferably form 0.5 to 20 times the weight, based on the weight of the silane compound.

The hydrolysis reaction time is preferably from 1 to 100 hours, more preferably from 10 to 70 hours, while the temperature is preferably from 0 to 50° C., more preferably form 15 to 30° C. The heat treatment after the hydrolysis is performed at a temperature of preferably 30° C. or greater, more preferably 50° C. or greater but not greater than 75° C. for preferably from 1 to 100 hours, more preferably from 10 to 70 hours. When the heat treatment temperature after hydrolysis is too low, transition from the aggregate of silicate ion to zeolite fine crystals may not occur easily and physical property-improving effect of the porous film forming composition may not be expected. When the heat treatment temperature exceeds 75° C., on the other hand, zeolite crystals may grow to even a particle size of 50 nm or greater. Use of such large crystals for the core may cause surface roughening of a film thus formed or interfere with the formation of the shell.

The zeolite sol thus obtained may comprise fine particles having an average particle size of from 3 to 50 nm. It has markedly high mechanical strength because it has a similar crystal structure to that of zeolite having a particle size of 50 nm or greater. Since these particles have a uniform and microporous crystal structure, they have excellent mechanical strength even though pores are distributed at a considerably high rate in the whole film thus formed.

(II) Core Containing Inorganic Silica or Organic Silica

On the other hand, inorganic or organic silica is also usable as the material for the core of the invention. It is industrially very advantageous material because it can be prepared easily in a short time compared with zeolite. Organic silicon oxide fine particles containing, in the core thereof, inorganic silica or organic silica can have high mechanical strength.

As is apparent from the example of a bulk film prepared by CVD, the silicon oxide material or particle has higher mechanical strength as the density of their Si—O—Si bond is higher. The organic silicon oxide fine particles to be used for the core, can be preferably prepared using a hydrolyzable silane compound or compounds, containing a compound represented by the following formula (4):

$$Si(OR^{10})_4 \qquad (4)$$

wherein $R^{10}$ may be the same or different and each independently represents a linear or branched $C_{1-4}$ alkyl group.

It is preferred because it can provide organic silicon oxide fine particles having a high Si—O—Si density among conventional used ones. They may subsidiarily contain one or more compounds represented by the following formula:

$$R^{14}{}_rSi(OR^{15})_{4-r} \qquad (8)$$

wherein $R^{14}$ may be the same or different and each independently represents a linear or branched $C_{1-6}$ alkyl group which may have a substituent; $R^{15}$, if there are a plurality of $R^{15}$, may be the same or different and each independently represents a linear or branched $C_{1-4}$ alkyl group; and r stands for an integer from 1 to 3.

Incorporation of such a compound of the formula (8) may be effective for reducing a dielectric constant.

Specific examples of the silane compound represented by the formula (4) used preferably for the formation of the inorganic or organic silica include, but not limited to, tetramethoxysilane, tetraethoxysilane, tetrapropoxysilane, tetrabutoxysilane, tetraisopropoxysilane, tetraisobutoxysilane, triethoxymethoxysilane, tripropoxymethoxysilane, tributoxymethoxysilane, trimethoxyethoxysilane, trimethoxypropoxysilane, and trimethoxybutoxysilane. Examples of the silane compound represented by the formula (8) include methyltrimethoxysilane, methyltriethoxysilane, methyltri-n-propoxysilane, methyltri-i-propoxysilane, methyltri-n-butoxysilane, methyltri-s-butoxysilane, methyltri-i-butoxysilane, methyltri-t-butoxysilane, ethyltrimethoxysilane, ethyltriethoxysilane, ethyltri-n-propoxysilane, ethyltri-i-propoxysilane, ethyltri-n-butoxysilane, ethyltri-s-butoxysilane, ethyltri-i-butoxysilane, ethyltri-t-butoxysilane, n-propyltrimethoxysilane, n-propyltriethoxysilane, n-propyltri-n-propoxysilane, n-propyltri-i-propoxysilane, n-propyltri-n-butoxysilane, n-propyltri-s-butoxysilane, n-propyltri-i-butoxysilane, n-propyltri-t-butoxysilane, i-propyltrimethoxysilane, i-propyltriethoxysilane, i-propyltri-n-propoxysilane, i-propyltri-i-propoxysilane, i-propyltri-n-butoxysilane, i-propyltri-s-butoxysilane, i-propyltri-i-butoxysilane, i-propyltri-t-butoxysilane, n-butyltrimethoxysilane, n-butyltriethoxysilane, n-butyltri-n-propoxysilane, n-butyltri-i-propoxysilane, n-butyltri-n-butoxysilane, n-butyltri-s-butoxysilane, n-butyltri-i-butoxysilane, n-butyltri-t-butoxysilane, i-butyltrimethoxysilane, i-butyltriethoxysilane, i-butyltri-n-propoxysilane, i-butyltri-i-propoxysilane, i-butyltri-n-butoxysilane, i-butyltri-s-butoxysilane, i-butyltri-i-butoxysilane, i-butyltri-t-butoxysilane, s-butyltrimethoxysilane, s-butyltriethoxysilane, s-butyltri-n-propoxysilane, s-butyltri-i-propoxysilane, s-butyltri-n-butoxysilane, s-butyltri-s-butoxysilane, s-butyltri-i-butoxysilane, s-butyltri-t-butoxysilane, t-butyltrimethoxysilane, t-butyltriethoxysilane, t-butyltri-n-propoxysilane, t-butyltri-i-propoxysilane, t-butyltri-n-butoxysilane, t-butyltri-s-butoxysilane, t-butyltri-i-butoxysilane, t-butyltri-t-butoxysilane, dimethyldimethoxysilane, dimethyldiethoxysilane, dimethyldi-n-propoxylsilane, dimethyldi-i-propoxysilane, dimethyldi-n-butoxysilane, dimethyldi-s-butoxysilane, dimethyldi-i-butoxysilane, dimethyldi-t-butoxysilane, diethyldimethoxysilane, diethyldiethoxysilane, diethyldi-n-propoxylsilane, diethyldi-i-propoxysilane, diethyldi-n-butoxysilane, diethyldi-s-butoxysilane, diethyldi-i-butoxysilane, diethyldi-t-butoxysilane, di-n-propyldimethoxysilane, di-n-propyldiethoxysilane, di-n-propyldi-n-propoxylsilane, di-n-propyldi-i-propoxysilane, di-n-propyldi-n-butoxysilane, di-n-propyldi-s-butoxysilane, di-n-propyldi-i-butoxysilane, di-n-propyldi-t-butoxysilane, di-i-propyldimethoxysilane, di-i-propyldiethoxysilane, di-i-propyldi-n-propoxylsilane, di-i-propyldi-i-propoxysilane, di-i-propyldi-n-butoxysilane, di-i-propyldi-s-butoxysilane, di-i-propyldi-i-butoxysilane, di-i-propyldi-t-butoxysilane, di-n-butyldimethoxysilane, di-n-butyldiethoxysilane, di-n-butyldi-n-propoxylsilane, di-n-butyldi-i-propoxysilane, di-n-butyldi-n-butoxysilane, di-n-butyldi-s-butoxysilane, di-n-butyldi-i-butoxysilane, di-n-butyldi-t-butoxysilane, di-i-butyldimethoxysilane, di-i-butyldiethoxysilane, di-i-butyldi-n-propoxylsilane, di-i-butyldi-i-propoxysilane, di-i-butyldi-n-butoxysilane, di-i-butyldi-s-butoxysilane, di-i-butyldi-i-butoxysilane, di-i-butyldi-t-butoxysilane, di-s-butyldimethoxysilane, di-s-butyldiethoxysilane, di-s-butyldi-n-propoxylsilane, di-s-butyldi-i-propoxysilane, di-s-butyldi-n-butoxysilane, di-s-butyldi-s-butoxysilane, di-s-butyldi-i-butoxysilane, di-s-butyldi-t-butoxysilane, di-t-butyldimethoxysilane, di-t-butyldiethoxysilane, di-t-butyldi-n-propoxylsilane, di-t-butyldi-i-propoxysilane, di-t-butyldi-n-butoxysilane, di-t-butyldi-s-butoxysilane, di-t-butyldi-i-butoxysilane, di-t-butyldi-t-butoxysilane, trimethylmethoxysilane, trimethylethoxysilane, trimethyl-n-propoxysilane, trimethyl-i-propoxysilane, trimethyl-n-butoxysilane, trimethyl-s-butoxysilane, trimethyl-i-butoxysilane, trimethyl-t-butoxysilane, triethylmethoxysilane, triethylethoxysilane, triethyl-n-propoxylsilane, triethyl-i-propoxysilane, triethyl-n-butoxysilane, triethyl-s-butoxysilane, triethyl-i-butoxysilane, triethyl-t-butoxysilane, tri-n-propylmethoxysilane, tri-n-propylethoxysilane, tri-n-propyl-n-propoxysilane, tri-n-propyl-i-propoxysilane, tri-n-propyl-n-butoxysilane, tri-n-propyl-s-butoxysilane, tri-n-propyl-i-butoxysilane, tri-n-propyl-t-butoxysilane, tri-i-propylmethoxysilane, tri-i-propylethoxysilane, tri-i-propyl-n-propoxylsilane, tri-i-propyl-i-propoxysilane, tri-i-propyl-n-butoxysilane, tri-i-propyl-s-butoxysilane, tri-i-propyl-i-butoxysilane, tri-i-propyl-t-butoxysilane, tri-n-butylmethoxysilane, tri-n-butylethoxysilane, tri-n-butyl-n-propoxylsilane, tri-n-butyl-i-propoxysilane, tri-n-butyl-n-butoxysilane, tri-n-butyl-s-butoxysilane, tri-n-butyl-i-butoxysilane, tri-n-butyl-t-butoxysilane, tri-i-butylmethoxysilane, tri-i-butylethoxysilane, tri-i-butyl-n-propoxylsilane, tri-i-butyl-i-propoxysilane, tri-i-butyl-n-butoxysilane, tri-i-butyl-s-butoxysilane, tri-i-butyl-i-butoxysilane, tri-i-butyl-t-butoxysilane, tri-s-butylmethoxysilane, tri-s-butylethoxysilane, tri-s-butyl-n-propoxylsilane, tri-s-butyl-i-propoxysilane, tri-s-butyl-n-butoxysilane, tri-s-butyl-s-butoxysilane, tri-s-butyl-i-butoxysilane, tri-s-butyl-t-butoxysilane, tri-t-butylmethoxysilane, tri-t-butylethoxysilane, tri-t-butyl-n-propoxylsilane, tri-t-butyl-i-propoxysilane, tri-t-butyl-n-butoxysilane, tri-t-butyl-s-butoxysilane, tri-t-butyl-i-butoxysilane and tri-t-butyl-t-butoxysilane.

According to the method of the invention, one or more of the silane compounds may be used as a mixture.

When a mixture of the compound(s) of the formula (4) and the compound(s) of the formula (8) is used as a raw material for the synthesis of the core, the Si—O—Si density inside the core is preferably high in order to achieve sufficient strength. An amount of the compound(s) of the formula (4) is therefore preferably 50 mol % or greater of the total amount of the mixture of the compound(s) of the formula (4) and the compound(s) of the formula (8).

Organic silicon oxide fine particles having the above core can be obtained by hydrolysis and condensation of the above hydrolyzable silane in the presence of an acid or basic catalyst. In order to increase the Si—O—Si bond density (condensation degree) to achieve high mechanical strength, the basic catalyst may be preferred.

Many compounds such as alkali metal hydroxide, organic ammonium hydroxide and amine are known as the basic catalyst. The basic catalyst may be used singly or in combination. Specific examples of the preferred basic catalyst include alkali metal hydroxides such as lithium hydroxide, sodium hydroxide, potassium hydroxide, and cesium hydroxide; ammonium salts such as tetramethylammonium hydroxide, choline, tetraethylammonium hydroxide, tetrapropylammonium hydroxide, tetrabutylammonium hydroxide, tetrapentylammonium hydroxide, and tetrahexylammonium hydroxide; and amines such as DBU, DABCO, triethylamine, diethylamine, pyridine, piperidine, piperazine and morpholine.

The basic catalyst is used in an amount of preferably from 1 to 50 mol %, more preferably from 5 to 30 mol %, still more preferably from 10 to 20 mol % based on the total amount of the hydrolyzable silane. An excessively large amount of the catalyst may make it difficult to obtain a low k film because growth of organic silicon oxide fine particles may be inhibited and sufficient growth may not be expected. An excessively small amount, on the other hand, may make it impossible to achieve intended strength because of insufficient condensation of siloxane.

Fine particles having higher mechanical strength can be obtained, for example, by using, as described below, a hydrophobic quaternary ammonium hydroxide and a hydrophilic quaternary ammonium hydroxide in combination as the catalyst. The hydrophilic catalyst is an alkali metal hydroxide or a quaternary ammonium hydroxide represented by the following formula (9):

$$(R^{16})_4N^+OH^- \qquad (9)$$

wherein $R^{16}$ may be the same or different and each independently represents a $C_{1-2}$ hydrocarbon group which may contain an oxygen atom; and the cationic moiety $[(R^{16})_4N^+]$ satisfies the following equation (A):

$$(N+O)/(N+O+C) \leqq 1/5 \qquad (A)$$

wherein N, O, and C represent the number of nitrogen, oxygen and carbon atoms contained in the cationic moiety, respectively. The hydrophobic catalyst is preferably a compound represented by the following formula (10):

$$(R^{17})_4N^+OH^- \qquad (10)$$

wherein $R^{17}$ may be the same or different and each independently represents a linear or branched $C_{1-8}$ alkyl group with the proviso that all $R^{17}$ do not represent a methyl group at the same time; and the cationic moiety $[(R^{17})_4N^+]$ satisfies the following equation (B):

$$(N+O)/(N+O+C) < 1/5 \qquad (B)$$

wherein N, O, and C represent the number of nitrogen, oxygen and carbon atoms contained in the cationic moiety, respectively.

The organic silicon oxide fine particles prepared in such a manner may show higher strength compared with those prepared in the conventional manner.

When condensation is performed using the hydrophobic basic catalyst and the hydrophilic basic catalyst in combination, the hydrophilic basic catalyst is added preferably in an amount of from 0.2 to 2.0 mols per mol of the hydrophobic basic catalyst.

The hydrolysis and condensation reaction of the hydrolyzable silanes requires addition of water for hydrolysis and an amount of water to be added to the reaction system is preferably from 0.5 to 100 times the mole, more preferably from 1 to 10 times the mole necessary for hydrolyzing the silane compounds completely.

When the hydrolyzable silane is subjected to hydrolysis and condensation to obtain a polymer solution, the reaction system may contain, in addition to water, a solvent such as an alcohol corresponding to the alkoxy group of the silane compound. Examples include methanol, ethanol, isopropyl alcohol, butanol, propylene glycol monomethyl ether, propylene glycol monopropyl ether, propylene glycol monopropyl ether acetate, ethyl lactate and cyclohexanone.

The solvent other than water is added in an amount of preferably from 0.1 to 500 times the weight, more preferably from 1 to 100 times the weight, based on the weight of the silane compound.

Although the hydrolysis and condensation reaction of the silane compound may be performed under the conditions employed for the conventional hydrolysis and condensation reaction, the reaction temperature may be set to fall within a range of usually from 0° C. to the boiling point of an alcohol generated by the hydrolysis and condensation, preferably from room temperature (15° C.) to 80° C.

In a more convenient reaction method, silica fine particles may form and grow when the hydrolyzable silane substance(s) or solution dissolved in the above solvent is added to an aqueous solution (in some cases, mixed with an organic solvent)of the basic catalyst adjusted to the above reaction temperature. The addition may be usually dropwise or intermittent is usually for from 10 minutes to 24 hours, more preferably from 30 minutes to about 8 hours.

Then, a formation reaction of the shell portion, which will be described in detail later, can be conducted successively. Formation of the shell on the periphery of the core comprising the inorganic or organic silica may be started after a so-called aging reaction, that is, maintenance of conditions under which the hydrolysis and condensation reaction proceeds for preferably from 5 minutes to 4 hours, more preferably from 10 minutes to 1 hour after completion of the addition of the hydrolyzable silane for the formation of the core portion. It is also possible to change the composition continuously by carrying out the reaction while gradually changing the composition of the raw material from that for forming the core to that for forming the shell, or carrying out the reaction while partially overlapping the raw material for the core with the raw material for the shell.

[Shell]

Next, a shell is formed so as to completely cover the periphery of the inorganic or organic silicon oxide fine particles obtained by the above process as the core.

The shell has a ratio T/Q greater than that of the core wherein T is the number of silicon atoms having at least one bond directly attached to a carbon atom and Q is the number of silicon atoms having all of the four bonds attached to an oxygen atom, for the purpose of reducing chemical reactivity of silicon atoms constituting the core, thereby making chemical stability of the shell greater than that of the core. In addition, the shell preferably consists essentially of silicon atoms each having at least one bond to which a carbon atom is directly attached to prevent occurrence of a partially weak portion, thereby imparting high stability to the shell. This means that the T/Q ratio is preferably 95/5 or greater, more preferably 98/2 or greater. Since the shell should be a dense film covering the core completely, it contains a skeleton derived from a multinuclear hydrolyzable silane which contains hydrolyzable-group-having silicon atoms bound via a hydrocarbon group which will be described later.

As another expected effect of the shell, it is used for imparting deformability to the surface of the particles in order to widen a contact area between particles to heighten the interparticle bindings at the time of film formation. The skeleton derived from a multinuclear hydrolyzable silane having a silicon atom directly attached to a hydrocarbon group is expected to have a function of increasing the contact surface area between the particles at the time of film formation.

As described above, after completion of the formation of the core and if necessary, after the aging step, it is preferred to carry out the shell formation successively. When the core is isolated or it is left to stand for a long period of time, aggregation of fine particles may possibly occur. The aging may be performed by maintaining the hydrolysis and condensation reaction conditions of the core for preferably from 5 minutes to 4 hours, more preferably from 10 minutes to 1 hour after completion of the addition of the hydrolyzable silane as the material of the core. The aging may be effective for forming a shell with a thinner layer and reflecting the mechanical strength of the core in the resulting film. The shell is preferably formed using a basic catalyst to serve as a protective film having high density. A shell with high density can be obtained by starting the formation of the shell on fine particles of the core, which have been just prepared and therefore have, on the surface thereof, very active silanol groups, immediately after preparation or after re-adjustment of the reaction conditions, thereby causing an efficient reaction between the shell-forming material and the surface of the fine particles.

Formation of a shell by using the catalyst adsorbed to the surface of the fine particles during core formation is effective for suppressing the generation of new fine particles composed only of the shell-forming material.

A shell can be formed on the surface of zeolite by adding dropwise a solution containing the raw material of the shell portion to the zeolite fine particle solution of the core successively after preparation thereof by the above zeolite preparation process. During the formation, an alcohol solvent may be added as needed or a basic catalyst having high hydrophilicity may be added further. When gelation occurs during the shell-forming operation, addition of alcohol can prevent gelation effectively. The basic catalyst having high hydrophilicity may be effective for forming a shell having a high crosslink density and high chemical stability.

When the silica obtained using the acid catalyst is used as the core, the catalyst system should be changed from an acid to a base for obtaining a shell having a high density and therefore having high chemical stability.

A shell can be formed on or above the silica core produced in the presence of the basic catalyst, using an alkoxysilane as a raw material without substantial re-adjustment of the reaction mixture such as addition of a new catalyst. In particular, a catalyst design for obtaining a core having high mechanical strength and a catalyst design for obtaining a shell having a high crosslink density and therefore providing high chemical stability are the same so that it is preferred to successively add dropwise the shell-forming material to the reaction system used for the formation of the core.

Compared with the core component, the fundamental structure of the shell component has a low polarity and has accordingly a property of having a low dielectric constant. It has low mechanical strength and is likely to collapse so that it is not suited for forming pores mainly by making use of interparticle spaces. As a result, the film produced by using it has a high dielectric constant or even if it has a low dielectric constant, it tends to have very low mechanical strength. Even if the combination of the core component and the shell component is the same, balance as a whole film between dielectric constant and strength differs, depending on the size of fine particles or thickness of the shell. The combination providing an optimum balance should be adopted as needed depending on the application purpose.

When a shell is formed on the same core, the shell is preferably not so thick in order to achieve a low dielectric constant. For this purpose, it is preferred to carry out, after completion of the addition of a core-forming material in a core formation step, the aging step and then start the addition of a shell-forming material.

Use of a shell having a certain thickness, on the other hand, causes a slight increase in dielectric constant, but can increase the film strength after baking because a contact area between particles widens due to deformability of the shell. When formation of a shell having a certain thickness is desired, dropwise addition of a shell-forming material may be started prior to the completion of the dropwise addition of a core-forming material to form an intermediate layer having a gradient composition. Alternatively, an intermediate-layer-forming material may be added dropwise separately after completion of the dropwise addition of a core-forming material to form an intermediate layer and then, a shell may be formed as the outer layer of the resulting intermediate layer.

The thickness of the intermediate layer is preferably from 0 to 0.5 nm, more preferably from 0 to 0.1 nm. Formation of the intermediate layer is effective for imparting chemical stability to the resulting film without significantly deteriorating the mechanical strength of it.

The material used for the formation of the shell of the invention is a hydrolyzable silane compound or compounds, containing a hydrolyzable silane having two or more silicon atoms substituted with a hydrolyzable group and linked via a carbon chain or a chain containing a silicon atom between some carbons.

Examples of the hydrolyzable silane compound or compounds, having two or more silicon atoms substituted with a hydrolyzable group and linked via a carbon chain or a chain containing a silicon atom between some carbons and used preferably for the formation of the shell include one or more hydrolyzable compounds represented the following formula (1) or (8):

$$\{R^1_nX^1_{3-n}Si—[(Y^2)—(SiR^2_mX^2_{2-m})]_p\}_q—(Y^3)—SiR^3_tX^3_{3-t} \quad (1)$$

wherein $X^1$ to $X^3$ each independently represents a hydrolyzable group selected from the group consisting of a hydrogen atom, halogen atoms and $C_{1-4}$ alkoxy groups; $R^1$ to $R^3$ each independently represents a $C_{1-20}$ alkyl group or a $C_{6-10}$ aryl group; $Y^2$ and $Y^3$ each independently represents a substituted or unsubstituted $C_{1-6}$ hydrocarbon group having q+1 valencies, a $C_{5-20}$ cycloalkane group which has q+1 valencies and may contain a fused ring structure, or a $C_{6-20}$ aromatic group having q+1 valencies; m each independently represents an integer from 0 to 2; n each independently represents an integer from 0 to 2; p each independently represents an integer from 0 to 4; q each independently represents an integer of 1 or greater; and t each independently represents an integer from 0 to 2;

$$R^{14}_rSi(OR^{15})_{4-r} \quad (8)$$

wherein $R^{14}$ may be the same or different and each independently represents a linear, branched or cyclic $C_{1-6}$ alkyl group which may have a substituent; $R^{15}$, when there are a plurality of $R^{15}$, may be the same or different and each independently represents a linear or branched $C_{1-4}$ alkyl group; and r stands for an integer from 1 to 3. With regard to $Y^2$ and $Y^3$ in the formula (1), examples of the $C_{1-6}$ hydrocarbon group having valencies of q+1 include methylene, ethylene, propylene, butylene and hexylene; those of the $C_{5-20}$ cycloalkane group having valencies of q+1 include groups having a cyclopentane ring structure and groups having a cyclohexane ring structure; those of the cycloalkane group containing a fused ring structure and valencies of q+1 include groups having a norbornane ring structure, groups having a bicyclodecane ring structure, and groups having an adamantane ring structure; those of the $C_{6-20}$ aromatic group having valencies of q+1 include groups having a benzene ring structure and groups having an anthracene ring structure. Examples of the substituent of $Y^2$ or $Y^3$ include methyl, ethyl, propyl, and butyl groups. In the formula (1), q may stand for from 0 to 20, preferably from 0 to 3. Examples of the substituent which $R^{14}$ may have in the formula (8) include methyl, ethyl, n-propyl, i-propyl, n-butyl, s-butyl, i-butyl, and t-butyl groups.

The hydrolyzable silane compound(s) as represented by the formula (1) and having two or more silicon atoms substituted with a hydrolyzable group and linked via a carbon chain or a chain containing a silicon atom between some carbons can prevent an increase in the number of substituents attached to silicon which do not participate in crosslinking. Accordingly, addition of the hydrolyzable silane compound(s) is effective for densifying a layer of the shell and the resulting shell is useful for enhancing chemical resistance. When the hydrolyzable silane compound(s) having two or more silicon atoms substituted with a hydrolyzable group and linked via a carbon chain or a chain containing a silicon atom between some carbons is mixed with a compound other than a multinuclear hydrolyzable silane, a ratio of the multinuclear hydrolyzable silane compound in all the hydrolyzable silane compounds is preferably 25% or greater, more preferably 40% or greater, still more preferably 50% or greater, each in terms of a silicon atom (the number of silicon atoms).

Of the compounds represented by the formula (1), more preferred are compounds represented by the formulas (2) and (3):

(Formula 2)

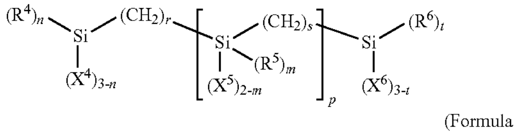

(Formula 3)

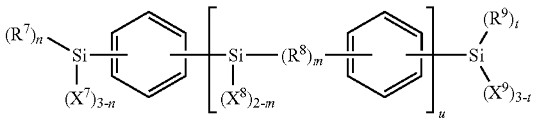

wherein $X^4$ to $X^9$ each independently represents a hydrolyzable group selected from the group consisting of hydrogen atom, halogen atoms and $C_{1-4}$ alkoxy groups; $R^4$ to $R^9$ each independently represents a $C_{1-20}$ alkyl group or a $C_{6-10}$ aryl group; m each independently represents an integer from 0 to 2; n each independently represents an integer from 0 to 2; p each independently represents an integer from 0 to 4; r each independently represents an integer from 0 to 4; s each independently represents an integer from 0 to 4; t each independently represents an integer from 0 to 2; and u each independently represents an integer from 0 to 4.

The skeletons represented by the formula (11) are shown below as specific examples of the skeletons of the compounds represented by the formulas (2) and (3).

Formula (11)

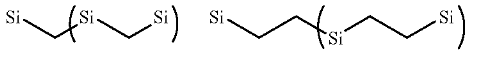

-continued

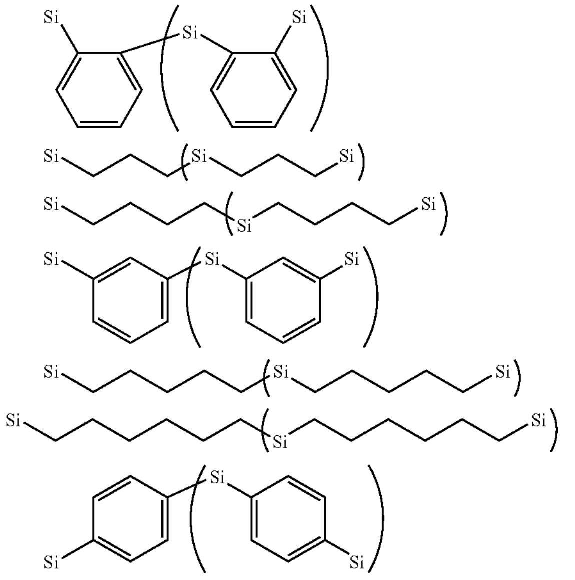

Specific examples of the hydrolyzable silane having the above skeleton include chain siloxanes such as 1,3-dimethyl-1,1,3,3-tetramethoxydisiloxane, 1,1,3-trimethyl-1,3,3-trimethoxydisiloxane, 1,1,3,3-tetramethyl-1,3-dimethoxydisiloxane, 1,3-dimethyl-1,1,3,3-tetraethoxydisiloxane, 1,1,3-trimethyl-1,3,3-triethoxydisiloxane, 1,1,3,3-tetramethyl-1,3-diethoxydisiloxane, 1,3-dimethyl-1,1,3,3-tetrapropoxydisiloxane, 1,1,3-trimethyl-1,3,3-tripropoxydisiloxane, 1,1,3,3-tetramethyl-1,3-dipropoxydisiloxane, 1,3-dimethyl-1,1,3,3-tetrabutoxydisiloxane, 1,1,3-trimethyl-1,3,3-tributoxydisiloxane, 1,1,3,3-tetramethyl-1,3-dibutoxydisiloxane, 1,3,5-trimethyl-1,1,3,5,5-pentamethoxytrisiloxane, 1,1,3,5-tetramethyl-1,3,5,5-tetramethoxytrisiloxane, 1,1,3,5,5-pentamethyl-1,3,5-trimethoxytrisiloxane, 1,3,5-trimethyl-1,1,3,5,5-pentaethoxytrisiloxane, 1,1,3,5-tetramethyl-1,3,5,5-tetraethoxytrisiloxane, 1,1,3,5,5-pentamethyl-1,3,5-triethoxytrisiloxane, 1,3,5,7-tetramethyl-1,1,3,5,7,7-hexamethoxytetrasiloxane, 1,1,3,5,7,7-hexamethyl-1,3,5,7-tetramethoxytetrasiloxane, 1,3,5,7-teteramethyl-1,1,3,5,7,7-hexaethoxytetrasiloxane, and 1,1,3,5,7,7-hexamethyl-1,3,5,7-tetraethoxytetrasiloxane and in addition, include bis(trimethoxysilyl)methane, bis(triethoxysilyl)methane, bis(methyldimethoxysilyl)methane, bis(methyldiethoxysilyl)methane, bis(dimethylmethoxysilyl)methane, bis(dimethylethoxysilyl)methane, 1,2-bis(trimethoxysilyl)ethane, 1,2-bis(triethoxysilyl)ethane, 1,2-bis(methyldimethoxysilyl)ethane, 1,2-bis(methyldiethoxysilyl)ethane, 1,2-bis(dimethylmethoxysilyl)ethane, 1,2-bis(dimethylethoxysilyl)ethane, 1,3-bis(trimethoxysilyl)propane, 1,3-bis(triethoxysilyl)propane, 1,3-bis(methyldimethoxysilyl)propane, 1,3-bis(methyldiethoxysilyl)propane, 1,3-bis(dimethylmethoxysilyl)propane, 1,3-bis(dimethylethoxysilyl)propane, 1,4-bis(trimethoxysilyl)butane, 1,4-bis(triethoxysilyl)butane, 1,4-bis(methyldimethoxysilyl)butane, 1,4-bis(methyldiethoxysilyl)butane, 1,4-bis(dimethylmethoxysilyl)butane, 1,4-bis(dimethylethoxysilyl)butane, 1,5-bis(trimethoxysilyl)pentane, 1,5-bis(triethoxysilyl)pentane, 1,5-bis (methyldimethoxysilyl)pentane, 1,5-bis(methyldiethoxysilyl)pentane, 1,5-bis(dimethylmethoxysilyl)pentane, 1,5-bis (dimethylethoxysilyl)hexane, 1,6-bis(trimethoxysilyl)hexane, 1,6-bis(triethoxysilyl)hexane, 1,6-bis (methyldimethoxysilyl)hexane, 1,6-bis (methyldiethoxysilyl)hexane, 1,6-bis (dimethylmethoxysilyl)hexane, 1,6-bis (dimethylethoxysilyl)hexane, 1,2-bis(trimethoxysilyl) benzene, 1,2-bis(triethoxysilyl)ethane, 1,2-bis (methyldimethoxysilyl)benzene, 1,2-bis (methyldiethoxysilyl)benzene, 1,2-bis (dimethylmethoxysilyl)benzene, 1,2-bis (dimethylethoxysilyl)benzene, 1,3-bis(triimethoxysilyl) benzene, 1,3-bis(triethoxysilyl)ethane, 1,3-bis (methyldimethoxysilyl)benzene, 1,3-bis (methyldiethoxysilyl)benzene, 1,3-bis (dimethylmethoxysilyl)benzene, 1,3-bis (dimethylethoxysilyl)benzene, 1,4-bis(trimethoxysilyl) benzene, 1,4-bis(triethoxysilyl)ethane, 1,4-bis (methyldimethoxysilyl)benzene, 1,4-bis (methyldiethoxysilyl)benzene, 1,4-bis (dimethylmethoxysilyl)benzene, and 1,4-bis (dimethylethoxysilyl)benzene.

These compounds have crosslinking groups at both ends thereof and a flexible structure at an intermediate portion thereof so that they can be easily structured and therefore have an improved film formation property compared with a simple silane compound. In particular, when components at the intermediate portion are bonded via an alkylene chain or phenylene chain, such a compound can form a shell having high hydrophobicity compared with a hydrolysis condensate of a compound having a siloxane bond or a silane compound.

The following are skeleton examples of the multinuclear hydrolyzable silane compound represented by the following formula (12) which can be used preferably in addition to the above ones.

Formula (12)

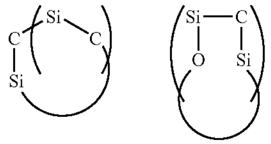

Specific examples of the hydrolyzable silane compound having two or more silicon atoms substituted with a hydrolyzable group and linked via a carbon chain or a chain containing a silicon atom between some carbons and having the above cyclic structure include 1,3,5-trimethyl-1,3,5-trimethoxy-1,3,5-trisilacyclohexane, 1,3,5-trimethyl-1,3,5-triethoxy-1,3,5-trisilacyclohexane, 1,3,5-trimethyl-1,3,5-tripropoxy-1,3,5-trisilacyclohexane, 1,3,5-trimethyl-1,3,5-tributoxy-1,3,5-trisilacyclohexane, 1,3,5,7-tetramethyl-1,3,5,7-tetramethoxy-1,3,5,7-tetrasilacyclooctane, 1,3,5,7-tetramethyl-1,3,5,7-tetraethoxy-1,3,5,7-tetrasilacyclooctane, 1,3,5,7-tetramethyl-1,3,5,7-tetrapropoxy-1,3,5,7-tetrasilacyclooctane, 1,3,5,7-tetramethyl-1,3,5,7-tetrabutoxy-1,3,5,7-tetrasilacyclooctane, 1,3,5,7-tetramethyl-1,3,5,7-tetramethoxy-1,3,5,7-tetrasila-2,6-dioxacyclooctane, 1,3,5,7-tetramethyl-1,3,5,7-tetraethoxy-1,3,5,7-tetrasila-2,6-dioxacyclooctane, 1,3,5,7-tetramethyl-1,3,5,7-tetrapropoxy-1,3,5,7-tetrasila-2,6-dioxacyclooctane, 1,3,5,7-tetramethyl-1,3,5,7-tetrabutoxy-1,3,5,7-tetrasila-2,6-dioxacyclooctane, 1,3,6,9-tetramethyl-1,3,6,9-teteramethoxy-1,3,6,9-tetrasila-2,8-dioxacyclodecane, 1,3,6,9-tetramethyl-1,3,6,9-tetraethoxy-1,3,6,9-tetrasila-2,8-dioxacyclodecane, 1,3,6,9-tetramethyl-1,3,6,9-tetrapropoxy-1,3,6,9-tetrasila-2,8-dioxacyclodecane, and 1,3,6,9-tetramethyl-1,3,6,9-tetrabutoxy-1,3,6,9-tetrasila-2,8-dioxacyclodecane.

As the preferable hydrolyzable silane compound, which has two or more silicon atoms substituted with a hydrolyzable group and linked via a carbon chain or a chain having one silicon atom between some carbon atoms, other than the above compounds, multi-branched multinuclear hydrolyzable silane compounds can be mentioned. Specific skeleton examples of them are represented by the following formula (13):

Formula (13)

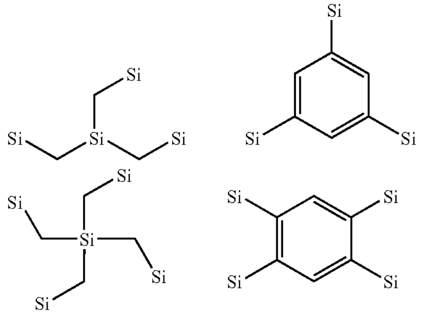

Some of the hydrolyzable silanes exemplified above contain an aromatic ring. Introduction of an aromatic ring is effective for improving the carbon concentration without deteriorating the heat resistance. In addition, an aromatic radical is, similar to a silyl radical, stable and Si and an aromatic ring tend to form a bond so that such a hydrolyzable silane is effective for improving strength.

The hydrolyzable silane represented by the formula (8) is a preferred compound here, including those exemplified above as a compound which can be added subsidiarily upon formation of the core.

When the hydrolyzable silane to be used for formation of the shell is designed in such a manner that it essentially contains a hydrolyzable silane compound having two or more silicon atoms substituted with a hydrolyzable group and linked via a carbon chain or a chain containing one silicon atom between some carbon atoms and at the same time, a ratio (T/Q) of the number (T) of the silicon atoms having at least one bond directly attached to a carbon atom to the number (Q) of silicon atoms having all of the four bonds attached to an oxygen atom is greater than that in the core, chemical stability can be achieved due to the hydrophobicity of the invention imparted to the shell. Presence of portions having low stability is not preferred for achieving higher stability. When a mixture of hydrolyzable silane compounds is used for the formation of a shell, the hydrolyzable silane contained in the mixture may preferably consist essentially of a hydrolyzable silane compound or compounds substituted with a substituent having a carbon atoms directly attached to a silicon atom. The term "consist essentially of" as used herein may include that 95 mol % or greater, in terms of silicon (the number of silicon atoms), more preferably 98 mol % or greater, still more preferably 100% of the hydrolyzable silane compound(s) contained in the mixture is a hydrolyzable silane substituted with a substituent having a carbon atom directly attached to a silicon atom. This makes it possible to ensure a certain level of chemical stability of the entire shell and prevent formation of a portion having weak chemical stability. As a result, the fine particles in their entirety can have high chemical stability.

When the shell is formed by the dropwise addition of the hydrolyzable silane compound, so-called aging time for a particularly long period of time is not necessary after the dropwise addition, because the silane compound reacts promptly after the dropwise addition. Long aging time however does not cause any marked deterioration. The film obtained by carrying out neutralization termination after aging for more than 4 hours after completion of the dropwise addition tends to have a reduced strength. The film obtained by carrying out neutralization termination within one hour tends to have high strength.

The minimum necessary amount of the hydrolyzable silane used for the shell layer can be determined by designing the thickness of the shell layer to be 0.025 nm or greater on average in order to completely cover the core with the shell layer. Under conditions for preparing silica fine particles having a particle size of 2 nm, particles are prepared while changing the weight ratio of (the core-forming material)/(the shell-forming material). As a result, formation of particles depending on the chemical properties of the shell may be recognized at a core/shell weight ratio falling within a range of 90/10 or less. The minimum necessary thickness of the shell layer assuming that the core and the shell have the same density may be estimated at 0.025 nm. When the amounts of hydrolyzable silane compounds used for the core and shell are compared in terms of silicon atoms (number of silicon atoms), the amount of the hydrolyzable silane compound(s) used for the shell is not greater than the molar equivalent used for the core. This means that the number of silicon atoms contained in the core is preferably greater than that contained in the shell. When the molar equivalent of the silane compound used for the shell exceeds that of the silane compound used for the core, there is a danger of the high mechanical strength of the core not being reflected sufficiently in the physical property of the entire silica fine particles. A preferable amount of the hydrolyzable silane used for the shell varies depending on the intended size of the fine particles. The weight ratio (core/shell) of the hydrolyzable silane compound for the core and that for the shell is preferably from 95/5 to 50/50. When the fine particles have an average particle size of about 2 nm, the weight ratio is preferably from 90/10 to 70/30.

When the hydrolysis and condensation reaction of the silane compound(s) for the formation of the shell is completed, a step of protecting a surface active silanol is preferably introduced. Described specifically, after neutralization reaction of the basic catalyst and prior to disappearance of crosslinking activity, more preferably immediately after the neutralization reaction, a divalent or higher valent carboxylic acid compound is added to protect the active silanol, or the neutralization reaction itself is performed with a divalent or higher valent carboxylic acid to simultaneously carry out neutralization and silanol protection. Thus, the crosslinking activity can be frozen until the decomposition of the carboxylic acid at the time of film formation.

Examples of the preferable carboxylic acid having, in the molecule thereof, at least two carboxyl groups include oxalic acid, malonic acid, malonic anhydride, maleic acid, maleic anhydride, fumaric acid, glutaric acid, glutaric anhydride, citraconic acid, citraconic anhydride, itaconic acid, itaconic anhydride and adipic acid. The carboxylic acid acts effectively when added in an amount of preferably from 0.05 to 10 mol %, more preferably from 0.5 to 5 mol %, each based on silicon unit.

[Film-Forming Composition]

The film-forming composition of the invention contains the organic silicon oxide fine particles of the invention and an organic solvent. The film-forming composition can be prepared in accordance with the conventional preparation process (for example, JP 2005-216895A or JP 2004-161535A) of a film-forming composition containing organic silicon oxide fine particles.

When the film-forming composition is used as a semiconductor insulating film material which will be described later and an alkali metal hydroxide is used as the hydrophilic basic catalyst, demetallization treatment is inevitably performed in any stage of from the above reaction termination to the preparation of a coating composition solution. Although there are many examples of the demetallization treatment, a method using an ion exchange resin or washing with an organic solvent solution is usually employed. Such demetallization treatment is not essential when a silica sol is prepared using a combination of only ammonium catalysts not containing a metal impurity, but it is the common practice to add a demetallization treatment step similarly.

In addition, a solvent such as water used for preparing a solution containing the organic silicon oxide fine particles is usually replaced by a solvent for coating which will be described later. There are many known examples of this method. Even in the case where the organic silicon oxide fine particles of the invention have been subjected to the above stabilization treatment, it may not be preferred to remove the solvent completely to isolate these particles.

Many solvents known as a solvent to be used for preparing a solution of a film-forming coating composition are usable for the film-forming composition of the invention. Specific examples include aliphatic hydrocarbon solvents such as n-pentane, isopentane, n-hexane, isohexane, n-heptane, 2,2,2-trimethylpentane, n-octane, isooctane, cyclohexane, and methylcyclohexane; aromatic hydrocarbon solvents such as benzene, toluene, xylene, ethylbenzene, trimethylbenzene, methylethylbenzene, n-propylbenzene, isopropylbenzene, diethylbenzene, isobutylbenzene, triethylbenzene, diisopropylbenzene, and n-amylnaphthalene; ketone solvents such as acetone, methyl ethyl ketone, methyl n-propyl ketone, methyl n-butyl ketone, methyl isobutyl ketone, cyclohexanone, 2-hexanone, methylcyclohexanone, 2,4-pentanedione, acetonylacetone, diacetone alcohol, acetophenone, and fenthion; ether solvents such as ethyl ether, isopropyl ether, n-butyl ether, n-hexyl ether, 2-ethylhexyl ether, dioxolane, 4-methyldioxolane, dioxane, dimethyldioxane, ethylene glycol mono-n-butyl ether, ethylene glycol mono-n-hexyl ether, ethylene glycol monophenyl ether, ethylene glycol mono-2-ethylbutyl ether, ethylene glycol dibutyl ether, diethylene glycol monomethyl ether, diethylene glycol dimethyl ether, diethylene glycol monoethyl ether, diethylene glycol diethyl ether, diethylene glycol monopropyl ether, diethylene glycol dipropyl ether, diethylene glycol monobutyl ether, diethylene glycol dibutyl ether, tetrahydrofuran, 2-methyltetrahydrofuran, propylene glycol monomethyl ether, propylene glycol dimethyl ether, propylene glycol monoethyl ether, propylene glycol diethyl ether; propylene glycol monopropyl ether, propylene glycol dipropyl ether, propylene glycol monobutyl ether, dipropylene glycol dimethyl ether, dipropylene glycol diethyl ether, dipropylene glycol dipropyl ether, and dipropylene glycol dibutyl ether, ester solvents such as diethyl carbonate, ethyl acetate, gamma-butyrolactone, gamma-valerolactone, n-propyl acetate, isopropyl acetate, n-butyl acetate, isobutyl acetate, sec-butyl acetate, n-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, dipropylene glycol monomethyl ether acetate, dipropylene glycol monoethyl ether acetate, dipropylene glycol mono-n-butyl ether acetate, glycol diacetate, methoxytriglycol acetate, ethyl propionate, n-butyl propionate, isoamyl propionate, diethyl oxalate, di-n-butyl oxalate, methyl lactate, ethyl lactate, n-butyl lactate, n-amyl lactate, diethyl malonate, dimethyl phthalate, and diethyl phthalate; nitrogen-containing solvents such as N-methylformamide, N,N-dimethylformamide, acetamide, N-methylacetamide, N,N-dimethylacetamide, N-methylpropionamide, and N-methylpyrrolidone, and sulfur-containing solvents such as dimethyl sulfide, diethyl sulfide, thiophene, tetrahydrothiophene, dimethyl sulfoxide, sulfolane and 1,3-propanesultone. The solvent may be used singly or in combination.

In some cases, a coating solution can be prepared by mixing a compound having an external-forming property such as polyether or long-chain alkyltrimethylammonium salt (SDA: structure-directing agent) or a heat-decomposable compound for simply forming pores. As the heat-decomposable compound, sugars, poly(meth)acrylates, and hydrocarbon compounds having a boiling point of from 250 to 400° C. are preferred.

Dilution is finally performed to prepare a composition for obtaining an intended film. The degree of dilution differs depending on the viscosity, intended film thickness or the like. Dilution is usually performed so that the amount of the solvent in the film composition may be preferably from 50 to 99% by weight, more preferably from 75 to 98% by weight. The concentration of the organic silicon oxide fine particles in the film-forming composition is preferably from 1 to 80% by weight, more preferably from 2 to 25% by weight.

As a material to be added to the film-forming composition, many film-forming auxiliary components including a surfactant are known and any of them can fundamentally be used for the film-forming composition of the invention. For example, a surfactant may be comprised by the film-forming composition preferably in an amount of from 0 to 3 % by weight.

The film-forming composition of the present invention may contain, as the polymer component of silicon, a polysiloxane prepared by another process. In order to achieve the advantage of the invention, the ratio of the polysiloxane prepared by another process is preferably 50% by weight or less, more preferably 20% by weight or less based on the weight of the organic silicon oxide fine particles.

[Porous Film]

A film of any film thickness can be formed by applying the porous-film-forming composition prepared in the above manner to a substrate by spin-coating at an adequate rotation number. The composition can be applied by not only spin-coating but also another method such as scan-coating.

The actual film thickness is usually from about 0.1 to 1.0 μm, but the thickness is not limited thereto. A film having a greater thickness can also be formed by application in a plurality of times.

The film thus formed can be made porous by a known manner. For example, a porous film can be obtained by removing the solvent by heating the film in an oven in a drying step (usually a step called "prebake" in a semiconductor process), preferably heating the film to from 50 to 150° C. for several minutes and then baking at from 350 to 450° C. for from 2 to 60 minutes. The heating step (baking step) may be followed or replaced by a step such as curing step to expose to an electron beam or light. As the light, for example, an ultraviolet ray may be employed.

[Semiconductor Device]

The porous film obtained in such a manner can be used as an insulating film in a semiconductor device in a known manner. The insulating film is mounted on a semiconductor device in a known manner. A semiconductor device equipped with such a porous insulating film having both high mechanical strength and high chemical stability can exhibits high performance and high reliability

EXAMPLES

Synthesis Example 1

A mixture of 8.26 g of a 25% aqueous solution of tetramethylammonium hydroxide, 34.97 g of ultrapure water, and 376.80 g of ethanol was heated to 60° C. in advance. A mixture of 19.48 g of tetramethoxysilane and 17.44 g of methyltrimethoxysilane was added dropwise over 1 hour, followed by the dropwise addition of a mixture of 4.33 g of 1,2-bis(trimethoxysilyl)ethane and 4.36 g of methyltrimethoxysilane to the reaction mixture over 15 minutes. After completion of the dropwise addition, the reaction mixture was cooled to 40° C. or less and neutralized with an aqueous solution of maleic acid. After addition of 150 g of propylene glycol propyl ether, the resulting mixture was concentrated at a temperature not greater than 40° C. under reduced pressure to distill off ethanol. Ethyl acetate (300 ml) was added, followed by washing three times with 200 ml of ultrapure water. Propylene glycol propyl ether (200 ml) was added and the resulting mixture was re-concentrated at a temperature not greater than 40° C. under reduced pressure. The solution thus obtained was filtered through a 0.05-μm filter to obtain Coating solution 1.

Synthesis Example 2

As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 17.05 g of tetramethoxysilane and 15.26 g of methyltrimethoxysilane was added dropwise over 1 hour, followed by the dropwise addition of a mixture of 6.49 g of 1,2-bis(trimethoxysilyl)ethane and 6.54 g of methyltrimethoxysilane over 15 minutes. Neutralization, concentration, washing with water, re-concentration, and filtration were performed in a similar manner to those of Synthesis Example 1 to obtain Coating solution 2.

Synthesis Example 3

As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 21.92 g of tetramethoxysilane and 19.62 g of methyltrimethoxysilane was added dropwise over 1 hour, followed by the dropwise addition of a mixture of 2.16 g of 1,2-bis(trimethoxysilyl)ethane and 2.20 g of methyltrimethoxysilane over 15 minutes. Neutralization, concentration, washing with water, re-concentration, and filtration were performed in a similar manner to those of Synthesis Example 1 to obtain Coating solution 3.

Synthesis Example 4

As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 19.48 g of tetramethoxysilane and 17.44 g of methyltrimethoxysilane was added dropwise over one hour, followed by the dropwise addition of a mixture of 5.10 g of 1,4-bis(trimethoxysilyl)benzene and 4.36 g of methyltrimethoxysilane over 15 minutes. Neutralization, concentration, washing with water, re-concentration, and filtration were performed in a similar manner to those of Synthesis Example 1 to obtain Coating solution 4.

Synthesis Example 5

As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 19.48 g of tetramethoxysilane and 17.44 g of methyltrimethoxysilane was added dropwise over one hour, followed by the dropwise addition of a mixture of 4.10 g of 1,4-bis(trimethoxysilyl)methane and 4.36 g of methyltrimethoxysilane over 15 minutes. Neutralization, concentration, washing with water, re-concentration, and filtration were then performed in a similar manner to those of Synthesis Example 1 to obtain Coating solution 5.

Synthesis Example 6

Silicon Oxide Derivative Obtained by Intermediate Aging After Preparation of a Core As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 19.48 g of tetramethoxysilane and 17.44 g of methyltrimethoxysilane was added dropwise over one hour. After completion of the dropwise addition, the reaction mixture was aged for one hour without changing the temperature. Then, a mixture of 4.33 g of 1,2-bis(trimethoxysilyl)ethane and 4.36 g of methyltrimethoxysilane was added dropwise over 15 minutes. Neutralization, concentration, washing with water, re-concentration, and filtration were performed in a similar manner to those of Synthesis Example 1 to obtain Coating solution 6.

Synthesis Example 7

Silicon Oxide Derivative having an Intermediate Layer

As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 17.05 g of tetramethoxysilane and 15.26 g of methyltrimethoxysilane was added dropwise over 60 minutes. Forty five minutes after the dropwise addition was started, the dropwise addition rate was reduced to half and at the same time, the dropwise addition of a mixture of 6.49 g of 1,2-bis(trimethoxysilyl)ethane and 6.54 g of methyltrimethoxysilane was started. When the dropwise addition of teramethoxysilane and methyltrimethoxysilane was completed after 15 minutes, the dropwise addition rate was doubled and dropwise addition of the latter mixture was performed over 30 minutes in total. Neutralization, concentration, washing with water, re-concentration, and filtration were performed in a similar manner to those of Synthesis Example 1 to obtain Coating solution 7.

Comparative Synthesis Example 1

As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 24.36 g of tetramethoxysilane and 21.80 g of methyltrimethoxysilane was added dropwise over 1 hour. Neutralization, concentration, washing with water, re-concentration, and filtration were performed in a similar manner to those of Synthesis Example 1 to obtain Coating solution 8.

Comparative Synthesis Example 2

As in Synthesis Example 1, a mixture of 8.26 g of a 25% aqueous solution of tetramethylammonium hydroxide, 34.97 g of ultrapure water, and 376.80 g of ethanol was heated to 60° C. in advance. A mixture of 21.63 g of 1,2-bis(trimethoxysilyl)ethane and 21.80 g of methyltrimethoxysilane was added dropwise over 1 hour. Neutralization, concentration, washing with water, re-concentration, and filtration were performed in a similar manner to those of Synthesis Example 1 to obtain Coating solution 9.

Comparative Synthesis Example 3

A mixture of 8.26 g of a 25% aqueous solution of tetramethylammonium hydroxide, 34.97 g of ultrapure water, and 376.80 g of ethanol was heated to 60° C. in advance. A mixture of 17.26 g of 1,2-bis(trimethoxysilyl)ethane and 17.39 g of methyltrimethoxysilane was added dropwise over 1 hour, followed by the dropwise addition of a mixture of 4.86 g of tetramethoxysilane and 4.35 g of methyltrimethoxysilane over 15 minutes. After completion of the dropwise addition, the reaction mixture was cooled to 40° C. or less and neutralized with an aqueous solution of maleic acid. After addition of 150 g of propylene glycol propyl ether, the resulting mixture was concentrated at a temperature not greater than 40° C. under reduced pressure to distill off ethanol. To the residue was added 300 ml of ethyl acetate, followed by washing three times with 200 ml of ultrapure water. Then, 200 ml of propylene glycol propyl ether was added and the resulting mixture was re-concentrated at a temperature not greater than 40° C. under reduced pressure. The solution thus obtained was filtered through a 0.05-μm filter to obtain Coating solution 10.

Examples 1 to 7 and Comparative Examples 1 to 3

Each of Coating solutions 1 to 7 (Examples 1 to 7) and Coating solutions 8 to 10 (Comparative Examples 1 to 3) was applied onto a Si wafer by spin coating. After soft baking at 120° C. for 2 minutes and at 200° C. for 2 minutes, the resulting wafer was baked at 400° C. for 1 hour in a baking furnace.

The dielectric constant of the porous film thus obtained was measured before washing (initial) and after washing of the porous film. The washing treatment of the porous film was performed by dipping the porous film in "EKC-520" (trade name; product of Dupont) at room temperature for 10 minutes. The dielectric constant was measured with "495-CV System" (trade name; product of SSM Japan). The elastic modulus (modulus) was measured using a nanoindenter (product of Nano Instruments). The measurement results of Examples 1 to 7 and Comparative Examples 1 to 3 are shown in Table 1.

TABLE 1

| | Initial Vlue | | Value After Washing | |
|---|---|---|---|---|
| | K-value | Modulus (GPa) | K-value | Modulus (GPa) |
| Example 1 | 2.43 | 6.9 | 2.45 | 6.6 |
| Example 2 | 2.39 | 6.6 | 2.41 | 6.4 |
| Example 3 | 2.48 | 7.0 | 2.52 | 6.7 |
| Example 4 | 2.41 | 6.7 | 2.43 | 6.5 |
| Example 5 | 2.45 | 7.0 | 2.48 | 6.7 |
| Example 6 | 2.28 | 5.8 | 2.32 | 5.6 |
| Example 7 | 2.41 | 6.6 | 2.44 | 6.4 |
| Comparative Example 1 | 2.51 | 7.2 | 2.78 | 4.8 |
| Comparative Example 2 | 2.29 | 3.4 | 2.3 | 3.4 |
| Comparative Example 3 | 2.32 | 3.6 | 2.68 | 3.6 |

As shown in Table 1, the porous film of Comparative Example 1 prepared without forming a shell showed significant deterioration by the washing treatment, while the porous film of Comparative Example 2 prepared using only the shell component showed a low modulus of elasticity. As is apparent from the initial values of physical properties, the porous films prepared in Example 1 to 7 have enhanced strength, reflecting the strength of the core component. With regard to the properties after the treatment of the washing fluid, deterioration of the porous films is very small, reflecting the stability of the shell component.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

The invention claimed is:

1. A porous-film-forming composition, comprising an organic silicon oxide fine particle comprising a core containing at least an inorganic silicon oxide or an organic silicon oxide and a shell containing at least an organic silicon oxide and being formed around the core by using shell-forming hydrolyzable silane in the presence of a basic catalyst;

wherein of silicon atoms constituting the core or the shell, a ratio (T/Q) of a number (T) of silicon atoms having at least one bond directly attached to a carbon atom to a number (Q) of silicon atoms having all of four bonds attached to an oxygen atom is greater in the shell than in the core; and wherein the shell-forming hydrolyzable silane comprise at least a hydrolyzable silane compound having two or more hydrolyzable-group-having silicon atoms bound to each other via a carbon chain or via a carbon chain containing one silicon atom between some carbon atoms, and an organic solvent.

2. A porous film obtained using the porous-film-forming composition as claimed in claim 1.

3. A method for forming a porous film, comprising steps of:

applying the porous-film-forming composition as claimed in claim 1 to form a film and subjecting the film to heat and/or to an electron beam or light.

4. The method for forming a porous film according to claim 3, wherein said step of subjecting comprises subjecting to heat and to an electron beam or light.

* * * * *